(12) United States Patent
Elzinga

(10) Patent No.: US 8,583,655 B2
(45) Date of Patent: Nov. 12, 2013

(54) USING AN INVERTED INDEX TO PRODUCE AN ANSWER TO A QUERY

(75) Inventor: D. Blair Elzinga, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 13/274,841

(22) Filed: Oct. 17, 2011

(65) Prior Publication Data

US 2013/0097126 A1    Apr. 18, 2013

(51) Int. Cl.
*G06F 17/30* (2006.01)

(52) U.S. Cl.
USPC .......................................... 707/741

(58) Field of Classification Search
USPC .......................................... 707/741
See application file for complete search history.

(56) References Cited

U.S. PATENT DOCUMENTS

| | | | | |
|---|---|---|---|---|
| 4,774,657 A | * | 9/1988 | Anderson et al. ............... | 1/1 |
| 6,131,092 A | * | 10/2000 | Masand ............................ | 1/1 |
| 2006/0259681 A1 | * | 11/2006 | Rudelic et al. .................. | 711/103 |
| 2007/0192293 A1 | | 8/2007 | Swen | |
| 2008/0243907 A1 | * | 10/2008 | Stergiou et al. ................ | 707/102 |
| 2008/0288480 A1 | * | 11/2008 | Yahia et al. ..................... | 707/5 |
| 2008/0294597 A1 | * | 11/2008 | Bourdoncle et al. ........... | 707/2 |
| 2009/0063471 A1 | * | 3/2009 | Erickson ......................... | 707/5 |
| 2009/0094236 A1 | * | 4/2009 | Renkes et al. .................. | 707/6 |
| 2010/0094881 A1 | * | 4/2010 | Brower et al. .................. | 707/753 |
| 2010/0185629 A1 | | 7/2010 | Jones | |

OTHER PUBLICATIONS

Patil et al., Inverted Indexes for Phrases and Strings, SIGIR, Jul. 2011 (10 pages).
Transier et al., Compressed Inverted Indexes for In-Memory Search Engines, 2008 (10 pages).

\* cited by examiner

*Primary Examiner* — Jorge A Casanova

(57) ABSTRACT

In response to a query having a search term, an inverted index that is defined on a set of attributes of a database structure is accessed, where the inverted index associates values of the set of attributes with corresponding references to rows of the database structure. It is determined whether any of the attributes in the set is in the search term. In response to determining that any of the attributes in the set is in the search term, the inverted index is used to produce an answer to the query.

12 Claims, 3 Drawing Sheets

USING AN INVERTED INDEX TO PRODUCE AN ANSWER TO A QUERY

BACKGROUND

Data is often collected and stored in databases. Access to a database can be managed by a database management system, such as a relational database management system (RDBMS). To retrieve or update data in a database, database queries, such as Structured Query Language (SQL) queries, can be submitted to the database management system.

A database can include one or multiple tables, where each table contains data arranged in rows and columns. In large databases, tables can be relatively large in size. To allow more efficient access of tables within a database, indexes can be maintained for the tables in the database. In response to a query to access a table on which an index is maintained, the database management system can access the index to more quickly formulate an answer to the query.

BRIEF DESCRIPTION OF THE DRAWINGS

Some embodiments are described with respect to the following figures.

DETAILED DESCRIPTION

Figure 1:
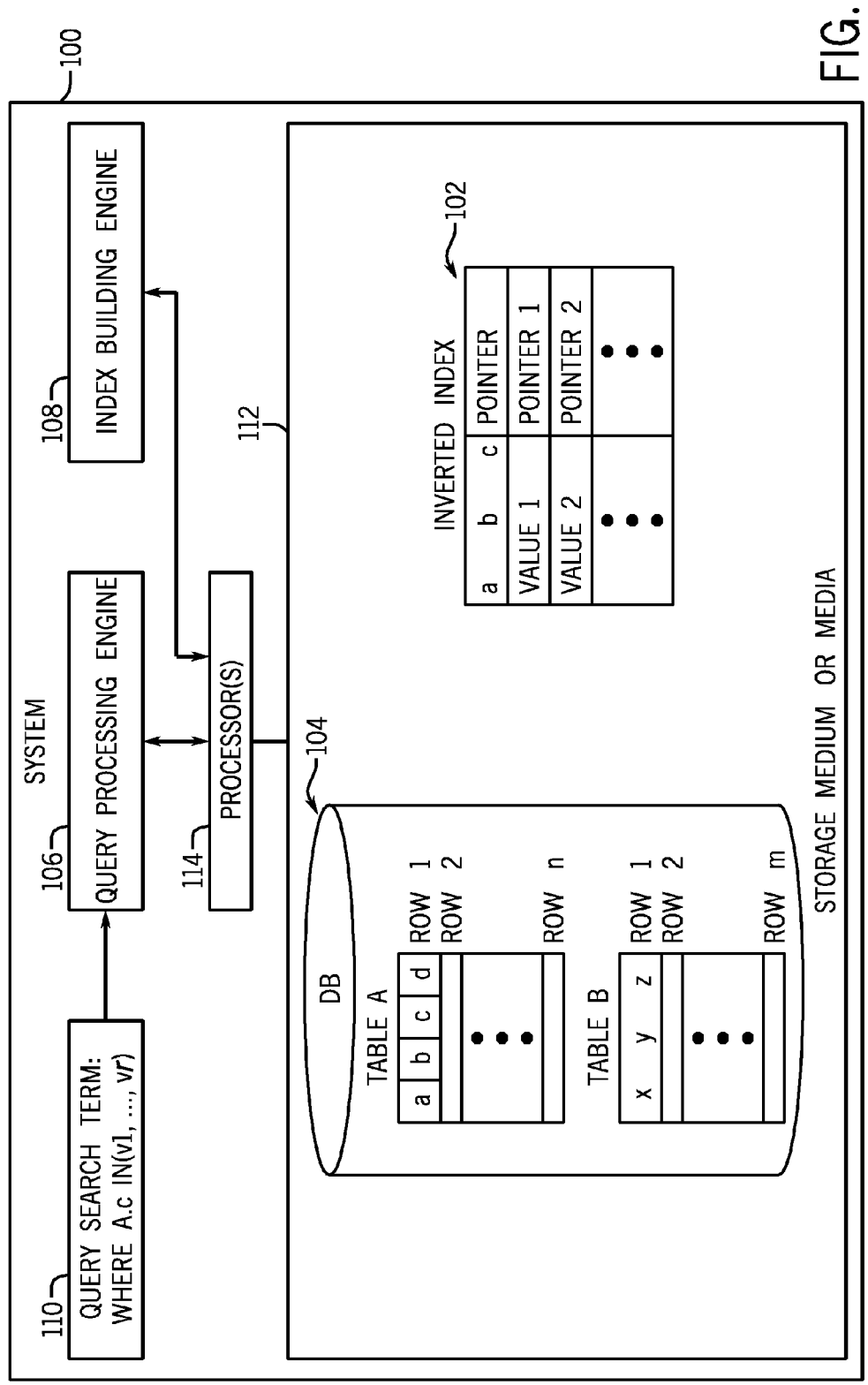
FIG. 1 is a block diagram of an example arrangement that includes an inverted index according to some implementations.

An index in a database management system can be defined on one or multiple attributes of a database table. Note that an "attribute" of a table is also referred to as a "column" of the table. An index that is defined on one attribute of a base table associates values of the index with respective locations of rows in the base table. An index that is defined on a set of attributes associates values of the set of attributes with respective locations of rows in the base table. An index defined on a set of attributes is also referred to as a compound index.

An index can be accessed in response to a query to access the base table. Use of the index can allow the query to be processed more quickly. The query can include a search term, which can specify a condition (or conditions) to be satisfied—rows of the base table satisfying the condition(s) of the search term are retrieved to form an answer to the query.

In a specific example, a set of attributes of a base table on which an index is defined can include attributes a, b, c (in that order). Attribute a is the "first attribute," while attribute b is the "second attribute." Attribute c is the "last attribute." In the foregoing example, "first," "second," and "last" refer to respective positions of attributes in the set of attributes on which the compound index is defined.

For certain types of indexes, including a B-tree index, that are defined on a set of attributes, there can be situations where use of the index may not be effective in speeding up processing of a query. A B-tree index is a type of tree indexing structure that includes a set of linked nodes (the nodes are linked together to form a tree-like structure which can have nodes at different levels). The highest level node in the B-tree index is its root, which points to children nodes, which in turn may point to more children nodes depending on the depth of the tree. The lowest level nodes have no children, and these nodes are referred to as "leaf nodes." Each leaf node of a B-tree holds one or multiple entries (up to some specified maximum number). Each entry in the leaf node is of the following format: (key value, a list of row identifiers). The key value refers to the attribute or attributes of a base table on which the B-tree index is defined. Each row identifier in an entry of a leaf node points to a row of the base table on which the B-tree index is maintained and the indexed attribute(s) of the row have the corresponding key value.

To effectively use a B-tree index that is defined on three or more attributes, a search term of a query would have to specify search values for all of the attributes of the multiple attributes, or search value(s) for the first attribute of the index, or search value(s) for the second attribute of the index. Specifying a search value for an attribute in a search term of a query refers to specifying a condition on the attribute in which a value of the attribute is specified (e.g. a search term specifying that a condition is satisfied if attribute a has any of values 2, 4, or 8).

In the foregoing example of the index that is defined on attributes a, b, c, the B-tree index would not be useable to produce an answer if a query has a search term that specifies search value(s) for just the last attribute (c) (in other words, the search term does not specify search value(s) for either attribute a or b). More generally, a B-tree index may not be useable in situations where a search term does not specify search value(s) for both the first and second attributes of the set of attributes on which the B-tree index is defined.

Also, if the search term of a query specifies a relatively large number of search values, then use of a B-tree index or other like index to produce an answer for the query becomes less efficient, since access times (associated with input/output accesses of storage media) associated with using the B-tree index for matching a relatively large number of search values can render processing more time-consuming than just a sequential search through the base table.

In accordance with some implementations, an inverted index is provided to allow more efficient processing of queries under various situations. The inverted index is an inverted compound index that is defined on a set of attributes of a database structure, such as a database table. Although the ensuing discussion refers to an inverted index defined on a database table, note that in alternative examples, an index can be provided for another type of database structure, such as a database view (which is used to store a result of a query), or other database structures.

An inverted index defined on a set of attributes associates respective values of the set of attributes with respective pointers to rows of a database table. The inverted index according to some implementations can be used in a relatively flexible manner. For example, with an inverted index that is defined on a set of three or more attributes of a base table, the inverted index can be used even though a query contains a search term that does not specify search value(s) for the first and second attributes of the set of attributes. Moreover, the inverted index can be efficiently used in situations where the search term of a query specifies a relatively large number of search values.

FIG. 1 shows an example system 100 that includes an inverted compound index 102 for table A in a database 104. The inverted index 102 and database 104 can be stored in a storage medium (or storage media) 112. Table A has multiple rows (row 1 to row n, where n is greater than 1). In the example of FIG. 1, each row of table A contains four attributes (also referred to as columns): a, b, c, d. The inverted index 102 is defined on three of the attributes of table A, namely attributes a, b, c. The inverted index 102 has multiple entries, where each entry corresponds to a value of a corresponding set of attributes a, b, c. A "value" of a set of attributes refers to a collection of the individual values of the multiple attributes. For example, value 1 in the inverted index 102 can have a value that is based on the collection of corresponding individual values a1, b1, c1 for attributes a, b, c, respectively.

Value 1 in the inverted index 102 is associated with pointer 1 (which is a reference to a particular row of table A), value 2 is associated with pointer 2 (which is a reference to another row of table A), and so forth. Note that some of the entries of the inverted index 102 can be associated with multiple pointers to multiple rows. For example, value 2 can be associated with multiple pointers to multiple rows, which indicates that the multiple rows contain the same value of the set of attributes a, b, c. In some examples, a pointer can be in the form of a row identifier, or any other type of identifier that would allow for a determination of which row the respective entry of the inverted index 102 is associated with.

In the example of FIG. 1, the database 104 also includes table B, which has rows 1 through m (m is greater than 1). Table B has attributes x, y, z. Although not shown in FIG. 1, an inverted index can also be defined on table B. There can be other tables in the database 104. The database 104 can also include other database structures, such as views and so forth.

FIG. 1 also depicts a query processing engine 106 and an index building engine 108. The query processing engine 106 and index building engine 108 can be part of a database management engine in a database system. The query processing engine 106 and index building engine 108 can include machine-readable instructions executable on one or multiple processors 114.

The index building engine 108 can receive a request to create an index on an underlying database structure (e.g. table, view, etc.). This request can be issued by a user, for example. Alternatively, the request can be submitted by an application or other entity in a database system. The index building engine 108 then retrieves the rows of the database structure, and uses such rows to populate the entries of the inverted index.

The query processing engine 106 is able to process a query (such as query 110) to provide an answer to the query. In processing the query 110, the query processing engine 106 is able to access a corresponding index, such as the inverted index 102, to more quickly retrieve an answer for the query. In the example shown in FIG. 1, the query 110 has a search term that includes a WHERE clause, which is a predicate clause of a database query, such as a Structured Query Language (SQL) query. The predicate clause in the search term of the received query 110 is based on a condition on attribute c in table A. Specifically, in FIG. 1, the attribute c in table A (A.c) is compared to values of an IN list, which includes a list of values (e.g. v1, . . . , vr, where r is greater than 1). The condition A.c IN (v1, . . . , vr) is equivalent to the following condition: A.c=v1 OR . . . OR A.c=vr.

In some examples, the IN list can be a relatively long list, which would result in a search for a relatively large number of values in table A. In such scenarios, use of a B-tree index or other like index may not be efficient. However, using the inverted index 102 to produce answers from table A in the example of FIG. 1 would result in enhanced efficiency.

Note also that in the example of FIG. 1, the search term of the query 110 includes the last attribute (c) of the set of attributes for the inverted index 102, but the search term does not include the first two attributes a and b of the set of attributes for the inverted index 102. In accordance with some implementations, the inverted index 102 can be used for the query 110 with such a search term (note that other types of indexes may not be useable in such scenarios, as noted above). Note that in using the inverted index 102, entries of the inverted index 102 that contain values of c that satisfy the WHERE clause of the query 110 would be identified, and the respective pointers would be used to retrieve the corresponding rows in table A to produce the answer to the query 110. The values of a and b in the inverted index 102 can be disregarded in this example.

The index building engine 108 builds an inverted index (e.g. inverted index 102) based on an underlying database structure (e.g. table A). The content of the inverted index 102 is populated using the content of the rows in table A.

Another feature of an inverted index according to some implementations is that the inverted index can be compressed for storage in the storage medium (or media) 112. The inverted index can be decompressed during use of the index for processing a query. The nature of the inverted index according to some implementations allows efficient use of the inverted index even though decompression is to be performed during use. Further details regarding compression of an inverted index are discussed further below.

Figure 2:
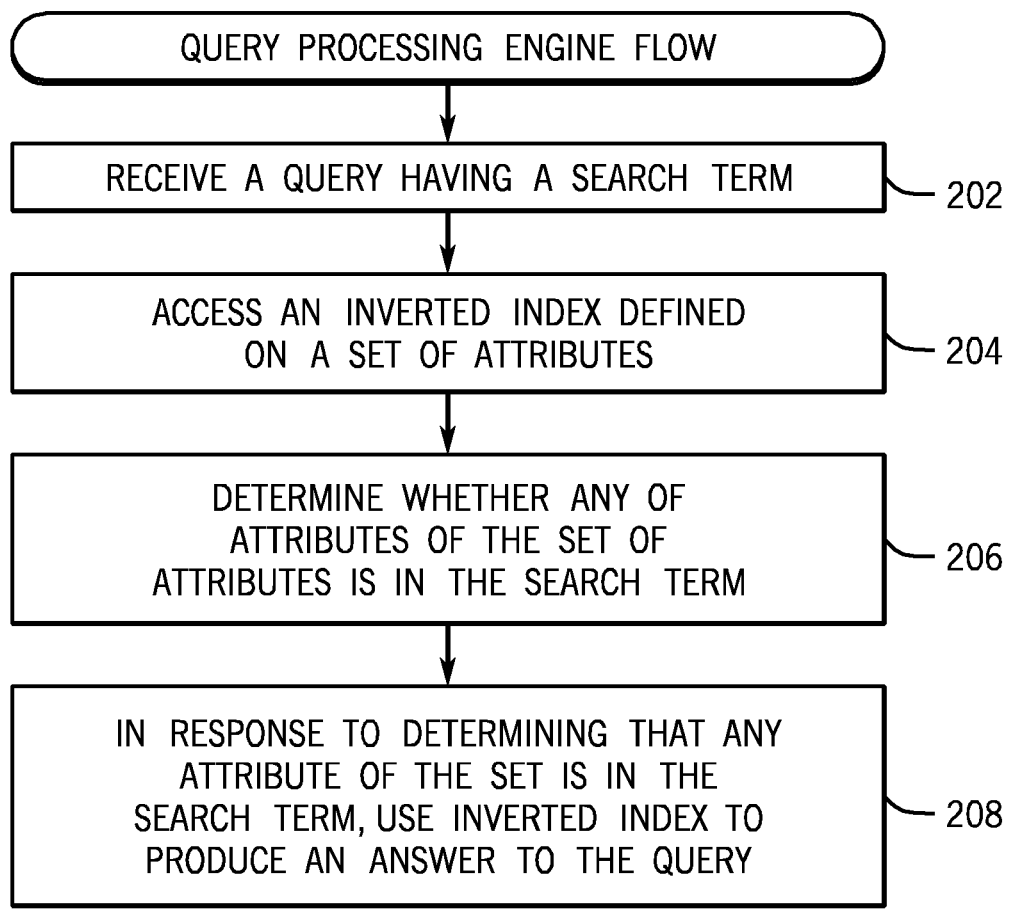
FIGS. 2 and 3 are flow diagrams of procedures to process a query, according to some implementations.

FIG. 2 is a flow diagram of a process of the query processing engine 106 according to some implementations. The query processing engine 106 receives (at 202) a query that has a search term (e.g. the query 110 of FIG. 1). In response to the query, the query processing engine 106 accesses (at 204) an inverted index (e.g. inverted index 102) that is defined on a set of attributes (e.g. set of attributes a, b, c) of a database structure (e.g. table A). "Accessing" the inverted index at 204 can include actually accessing the inverted index or accessing information associated with the inverted index (where the information can describe characteristics of the inverted index, such as the attribute(s) on which the inverted index is defined).

The query processing engine 106 determines (at 206) whether any of the attributes in the set of attributes is in the search term. If any attribute of the set of attributes is in the search term, then the inverted index is useable. As noted above, in accordance with some implementations, the inverted index can be used even in situations where the search term does not specify search values for the first and second attributes of the set of attributes. For example, the search term can include just the attribute in the last position of the set of attributes on which the inverted index is defined. The ability to use the inverted index in response to presence of "any" of the set of attributes in the search term is contrasted with other types of indexes in which a determination would be made for presence of certain attributes (e.g. either or both of the first and second attributes) of the set of attributes.

In response to determining that any attribute of the set is in the search term, the query processing engine 106 uses (at 208) the inverted index to produce an answer to the query.

Figure 3:
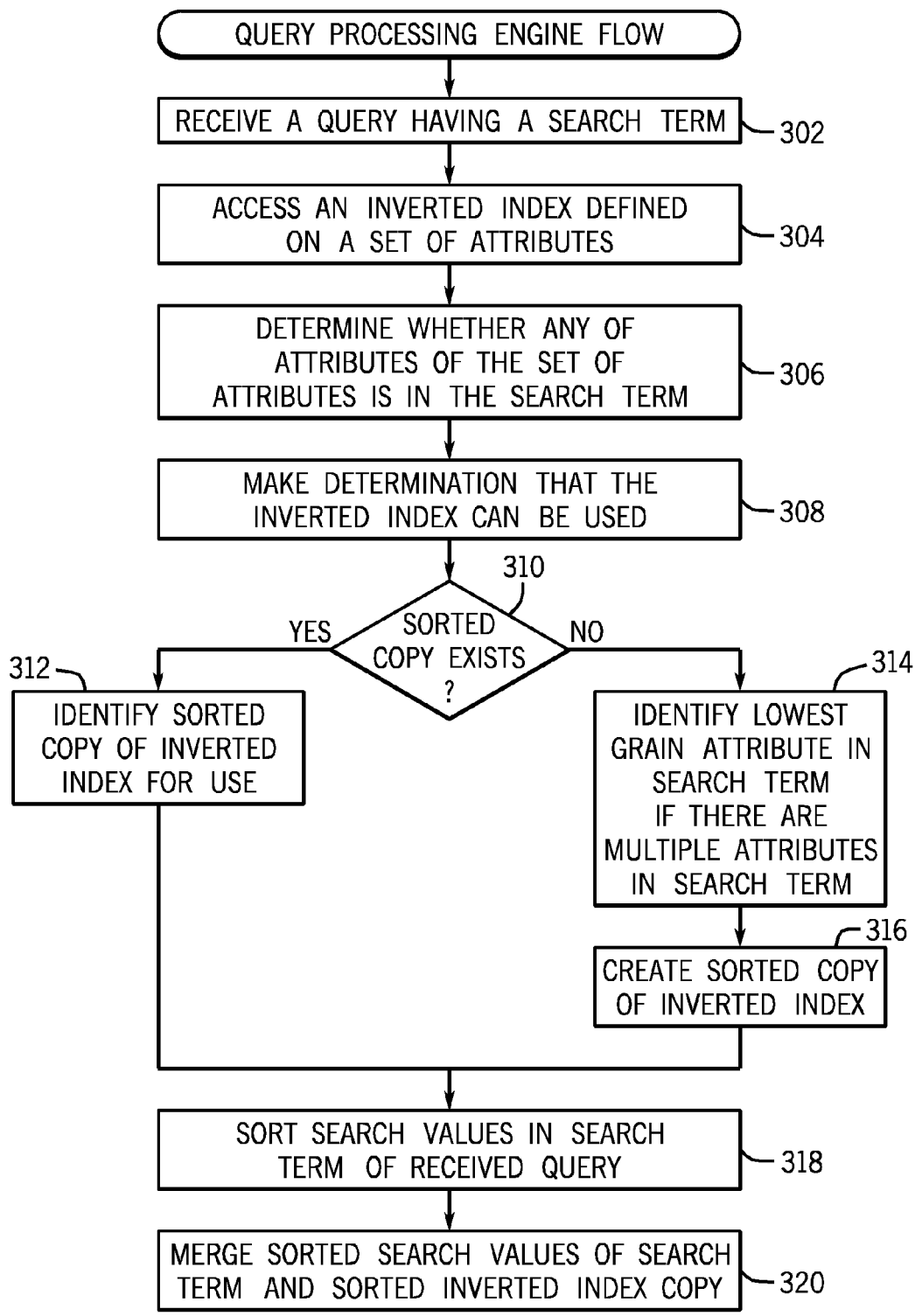

FIG. 3 is a flow diagram of a process of the query processing engine 106 according to alternative implementations. The query processing engine 106 receives (at 302) a query that has a search term. In response to the query, the query processing engine 106 accesses (at 304) an inverted index (e.g. inverted index 102) that is defined on a set of attributes.

The query processing engine 106 next determines (at 306) if any attribute of the set of attributes on which the inverted index is defined is present in the search term of the query. If so, the query processing engine makes a determination (at 308) that the inverted index can be used.

The query processing engine 106 next determines (at 310) if a sorted copy of the inverted index on the attribute(s) in the search term already exists. Note that there can be multiple copies of the inverted index that are sorted on different attributes. For example, for an inverted index defined on attributes a, b, c, there can be a first copy of the inverted index sorted on attributes a, b, c, there can be a second copy of the inverted index sorted on attribute c, there can be a third copy of the inverted index sorted on attributes b, a, and so forth. Sorting a copy of the inverted index on an attribute (or multiple attributes) refers to providing an ascending order or descending order of entries in the inverted index based on values of the attribute(s).

If it is determined (at 310) that a sorted copy of the inverted index already exists, then the sorted copy of the inverted index is identified (at 312) for use. However, if the sorted copy of the inverted index does not already exist, then the query processing engine 106 identifies (at 314) (in the context where the search term contains multiple attributes) the lowest grain attribute that is present in the search term of the received query. The lowest grain attribute is the one with the most number of unique values in the base table. For example, if a search term in a received query contains attributes b and c, and b has 100,000 unique values, but c has 500,000 unique values, then c would be the lowest grain attribute.

Once the lowest grain attribute is identified, then a copy of the inverted index is created (at 316), which is sorted based on the attributes of the query is performed, with the lowest grain attribute used as the primary attribute for sorting, followed by sorting based on the remaining attribute(s). Such sorting involves first sorting entries of the inverted index copy on the primary attribute, and for entries sharing the same value of the primary attribute, sorting on the next attribute, and so forth.

Note that multiple copies of the inverted index can be maintained that are sorted by different attribute(s). As different queries are received, corresponding copies of the inverted index (sorted differently) are created if such copies do not already exist.

In cases where the search term of the received query contains just a single attribute of the set of attributes on which the inverted index is defined, the copy of the inverted index created (at 316) is sorted on the single attribute.

The process of FIG. 3 sorts (at 318) the search values of the search term of the received query. For example, if the received query contains an IN list of values, then the values in the IN list can be sorted. A merge is then performed (at 320) between the sorted values of the search term and the sorted inverted index copy (created at 316). Performing the merge (at 320) involves comparing values of the sorted attribute(s) in the search term and values in the sorted inverted index; for each match between a value of the sorted attribute(s) in the search term and a corresponding value in the sorted inverted index, the respective pointer (or respective multiple pointers) from the inverted index is retrieved, and the corresponding row of the database structure is accessed to use in producing an answer to the query.

In some implementations, the inverted index (or a copy of the inverted index) can be compressed for storage. Any one of various compression techniques can be applied to the inverted index to reduce an amount of storage space consumed by the compressed inverted index as compared to an uncompressed inverted index. When the compressed inverted index is to be used for processing a query, the compressed inverted index can be decompressed. Due to the fact that use of the inverted index is based on the merge operation at 320 in FIG. 3 (where sorted search values of attribute(s) in the search term are merged with sorted values of the attribute(s) in the inverted index), the inverted index can actually be used even as the decompression is performed. In other words, as the decompression of the compressed inverted index is proceeding, the decompressed part (less than the entirety) of the inverted index can be used in the merge operation at 320.

As a result, the performance impact on query processing when using the compressed inverted index is reduced, while allowing for more efficient use of the storage capacity of a system.

In addition, note that the decompression of the inverted index can be performed in memory (rather than a persistent storage medium) in some implementations. Performing decompression in memory allows for faster decompression operation—moreover, in some examples, the decompressed copy of the inverted index does not even have to be stored to the persistent storage medium.

Various modules discussed above, such as the query processing engine 106 or index processing engine 108 of FIG. 1 can be implemented as machine-readable instructions that are loaded for execution on a processor or processors (e.g. 114 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of a system having a processor, comprising:
   in response to receiving a query having a search term, accessing an inverted index that is defined on a set of attributes of a database structure, wherein the inverted index associates values of the set of attributes with corresponding references to rows of the database structure;
   determining whether any of the attributes in the set is in the search term;
   in response to determining that any of the attributes in the set is in the search term, determining that the inverted index is useable to produce an answer to the query;
   in response to receiving the query, creating a first copy of the inverted index; and sorting the first copy of the inverted index according to at least one attribute in the search term of the received query, wherein producing the answer uses the sorted copy of the inverted index.

2. The method of claim 1, further comprising:
if the search term contains plural attributes, identifying a lowest grain attribute of the plural attributes, the lowest grain attribute being one of the plural attributes that has a largest number of unique values in the database structure,
wherein sorting the first copy of the inverted index is based on the identified lowest grain attribute.

3. The method of claim 1, further comprising:
receiving a second query that has a second search term;
in response to the second query, creating a second copy of the inverted index;
sorting the second copy of the inverted index according to at least one attribute in the second search term; and
using the second copy of the inverted index to produce an answer to the second query.

4. The method of claim 3, wherein the first copy of the inverted index is sorted differently from the second copy of the inverted index.

5. A system comprising:
at least one processor to:
in response to receiving a query containing a search term that specifies search values of at least one attribute, access an inverted index that is defined on a set of attributes of a database structure, where the inverted index associates values of the set of attributes with corresponding references to rows of the database structure;
determine whether any of the attributes in the set is in the search term;
in response to determining that any of the attributes in the set is in the search term, determine whether a copy of the inverted index sorted according to the at least one attribute of the search term exists;
in response to determining that the sorted copy of the inverted index does not exist, create the sorted copy of the inverted index in which records of the sorted copy of the inverted index are sorted according to the at least one attribute in the search term of the received query; and
compare the search values of the at least one attribute in the search term with values in the sorted copy of the inverted index to produce an answer to the query.

6. The system of claim 5, wherein the sorted copy of the inverted index is useable to produce the answer to the query even though the search term contains just an attribute that is in a last position of the set of attributes.

7. The system of claim 5, wherein the at least one processor is to further sort the search values in the search term according to the at least one attribute in the search term, where the sorted search values and the sorted copy of the inverted index are to be used to produce the answer to the query.

8. The system of claim 5, wherein the at least one processor is to compress the sorted copy of the inverted index for storing on at least one storage medium.

9. The system of claim 8, wherein the at least one processor is to further:
decompress the compressed inverted index to use in producing an answer to the query.

10. The system of claim 9, wherein the at least one processor is to further:
use a decompressed part of the compressed inverted index for producing the answer to the query, where the decompressed part is useable to produce the answer even before the compressed inverted index has been fully decompressed.

11. An article comprising at least one non-transitory machine-readable storage medium storing instructions that upon execution cause a system to:
in response to a query having a search term, access an inverted index that is defined on a set of attributes of a database structure, wherein the inverted index associates values of the set of attributes with corresponding references to rows of the database structure;
determine whether any of the attributes in the set is in the search term; in response to determining that any of the attributes in the set is in the search term, determine whether a copy of the inverted index sorted according to at least one attribute of the search term exists;
in response to determining that the sorted copy of the inverted index does not exist, create the sorted copy of the inverted index in which records of the sorted copy of the inverted index are sorted according to the at least one attribute in the search term of the received query; and
use the sorted copy of the inverted index to produce an answer to the query.

12. The article of claim 11, wherein the sorted copy of the inverted index is useable to produce the answer to the query even though the search term does not contain attributes in first and second positions of the set of attributes.

* * * * *